July 14, 1925.
A. H. SIMMONS
1,546,347
WAFFLE IRON
Filed Jan. 9, 1923
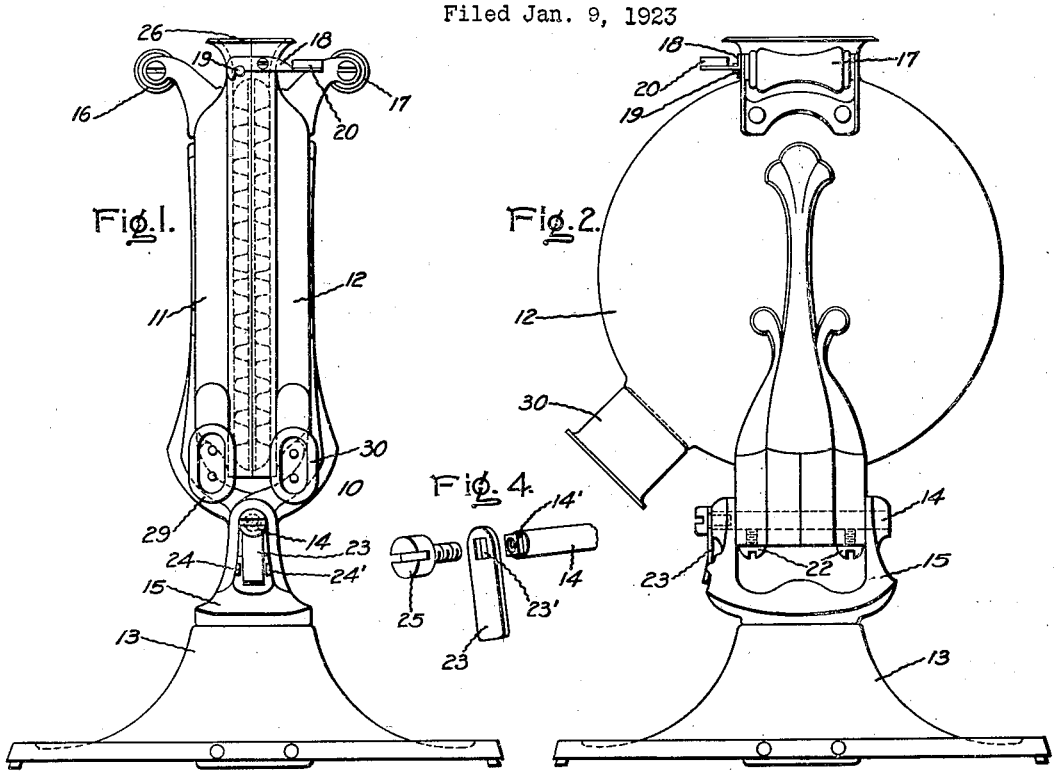
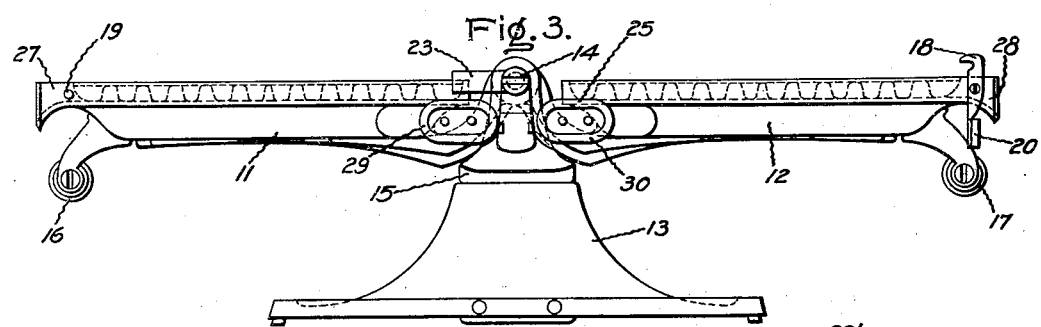
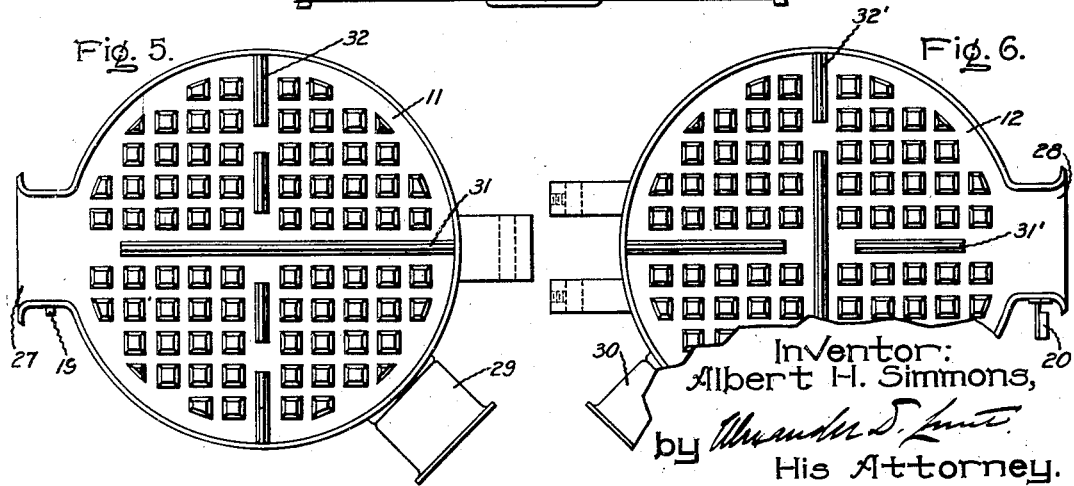
Inventor:
Albert H. Simmons,
by *[signature]*
His Attorney.

Patented July 14, 1925.

1,546,347

UNITED STATES PATENT OFFICE.

ALBERT H. SIMMONS, OF OAK PARK, ILLINOIS, ASSIGNOR TO EDISON ELECTRIC APPLIANCE COMPANY, INC., OF CHICAGO, ILLINOIS, A CORPORATION OF NEW YORK.

WAFFLE IRON.

Application filed January 9, 1923. Serial No. 611,658.

*To all whom it may concern:*

Be it known that I, ALBERT H. SIMMONS, a citizen of the United States, residing at Oak Park, in the county of Cook, State of Illinois, have invented certain new and useful Improvements in Waffle Irons, of which the following is a specification.

My invention relates to waffle irons and has for its object the provision of an improved device of this character.

My invention is particularly applicable to electrically heated waffle irons although it obviously has application to waffle irons in general regardless of their method of heating.

In the usual form of waffle iron the cooking plates forming the mold are mounted in horizontal positions and the mold is filled by lifting the upper plate and pouring the cooking material or batter on the lower plate. With this type of waffle iron there is always danger of filling the mold too full with its attendant waste of cooking material. Also, the waffle may not be cooked uniformly due to the fact that the waffle does not fill the upper plate as satisfactorily as the lower and, hence, the lower side is cooked more rapidly. This latter condition is particularly characteristic of electric waffle irons having non-reversible cooking plates.

In carrying out my invention I support the cooking plates normally in a substantially upright position and provide an aperture at the top through which the cooking material may be poured in after the waffle iron has been closed. As thus constructed there is much less probability of filling the mold too full. The cooking material also completely fills both plates so as to be cooked uniformly.

For a more complete understanding of my invention reference should be had to the accompanying drawing in which Fig. 1 is an elevation view of a waffle iron embodying my invention; Fig. 2 is a side elevation view of Fig. 1; Fig. 3 is an elevation view showing the waffle iron in open position; Fig. 4 is a detail view showing the latching means for holding the plates upright; Fig. 5 is a plan view of one cooking plate; while Fig. 6 is a plan view of the co-operating plate.

Referring to the drawing, in one form of my invention the waffle iron 10 comprises the cooking plates 11 and 12, provided with co-operating cooking surfaces forming the mold in which the waffle is cooked. The plates 11 and 12 are mounted on a supporting base 13. As shown, the plates are joined together in the manner of a hinge on a horizontal pivot rod 14 which is secured to the base 13. The pivot 14 may be and is shown carried in a yoke 15 which is secured on the base 13. This yoke may be mounted as shown on the base 13 so as to be rotatable about a vertical axis.

As thus mounted, the cooking plates 11 and 12 are normally maintained in substantially upright positions. They may be opened or spread apart, as shown in Fig. 3, to effect the removal of the cooked waffle. Suitable handles 16 and 17 are provided on the plates respectively by means of which they may be raised and lowered. When the plates are raised to closed position, as shown in Figs. 1 and 2, they are secured together by a latch 18 which is pivotally mounted on one of the plates, for example plate 12, and has its latching end adapted to engage a projection 19 on the plate 11. A button 20 is provided on the opposite end of the latching member by means of which the latching member may be conveniently released by depressing the button when it is desired to open the iron.

In order to releasably secure the plates in an upright position when the waffle iron is closed, the pivot rod 14 is rigidly secured to one of the plates, for example plate 12, by means of screws 22 and carries on one end a resilient latching arm 23 which, when the plate 12 is moved to closed position, rests between two latching projections 24 and 24' on the yoke 15. Since the two plates are latched together when the waffle iron is closed, plate 11 likewise is held in an upright position by latch 23. In opening the waffle iron, the latch slips over the projection 24 upon the application of a relatively small force by the operator, permitting plate 12 to be lowered to the position shown in Fig. 3. As shown in Fig. 4, the latch 23 may be secured to pivot rod 14 by providing a squared end 14' on the rod and a cooperating square aperture 23' in the latch, the latch being held on the rod by a screw 25. Obviously, if desired, one plate may be rigidly mounted in an upright position, the cooperating plate being pivotally mounted with relation to the first. Also, when both plates are pivoted they may be operatively connected so as to move together from one position to another.

The cooking material or batter is poured into the iron through an aperture 26 at the top. This aperture is formed by breaking away the edges of the cooking plates at adjacent points so as to form co-operating recesses in the plates. Co-operating flanges 27 and 28 are provided on the cooking plates adjoining the aperture 26. These flanges are shaped to form a funnel-like mouth around the aperture for the purpose of facilitating the pouring in of the cooking material.

The cooking plates are preferably electrically heated. Any suitable heating unit may be used. I have found that heating units of the sheath wire type are particularly adapted for this use. Such a heating unit is shown in U. S. Patent No. 1,367,341, to Charles C. Abbott. In the preferred form of my invention I cast a sheath wire heating unit (not shown) in each of the plates 11 and 12, the plates being preferably made of aluminum. The terminals for the heating units are brought out in suitable connecting plug receptacles or guards 29 and 30 on the cooking plates 11 and 12 respectively so that electrical connections can be made with the heating units in the cooking plates by means of suitable connecting plugs. As shown, the receptacles 29 and 30 are placed in corresponding positions and near the lower edge of each plate so that the electrical conductors leading from the connecting plugs will not interfere with the raising and lowering of the plates.

Referring to Figs. 5 and 6, the cooking surfaces of each of the plates 11 and 12 are provided with the usual ornamental configuration which determines the form of the waffle. Each plate is divided into four sections or quadrants with ribs or separators between for marking the waffle into corresponding sections. In one plate, for example plate 11, a separator 31 leads directly downward from the aperture 26 to the bottom, the cross separator 32 in this plate being divided into spaced sections providing apertures therethrough, as shown in Fig. 5. In plate 12 the separator 31' extending downward from aperture 26 is broken to provide a central aperture, as shown in Fig. 6, the cross separator 32' having a central section whereby part of the cooking material is diverted horizontally. Separator 32' is broken near each end providing apertures. By means of this arrangement of the cooking surfaces the cooking material as it is poured in through aperture 26 is evenly distributed throughout the mold. Obviously various other arrangements of the cooking surfaces may be made in order to effect an even distribution of the cooking material.

In using my waffle iron, the cooking plates are latched together in their upright positions and the cooking material poured in through the aperture at the top until a sufficient quantity has been poured in to obtain the desired results. The cooking material completely fills all parts of the mold and is therefore cooked uniformly throughout.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. A waffle iron comprising plates provided with cooperating cooking surfaces mounted in a substantially vertical position, said plates being formed to provide an aperture through which the cooking material may be poured in between said cooking surfaces, and a pivotal connection between said plates at the bottom thereof.

2. A waffle iron comprising plates provided with cooperating cooking surfaces, means for supporting said cooking plates in a substantially vertical position, said plates being provided with cooperating recesses forming an aperture at the top through which the cooking material may be poured in between said cooking surfaces, and a pivotal connection between said plates at the bottom thereof.

3. A waffle iron comprising cooperating cooking plates, a base member, a support for said plates pivotally mounted on said base member so as to be movable about a substantially vertical axis, and pivotal connections having a common axis between said plates and between said plates and said support.

4. A waffle iron comprising cooperating cooking plates, a support for said plates, pivotal connections having a common axis between said plates and between said plates and said support, means for releasably securing one of said plates to said support in an upright position, and means for securing the other plate to the first.

5. A waffle iron comprising cooperating cooking plates, a support for said plates, and a pin forming a common pivotal connection between said plates and between said plates and said support, connections between one of said plates and said pin and between said pin and said support whereby one of said plates may be secured in a predetermined position, and means for securing the other plate in a predetermined relation with the first.

6. A waffle iron comprising cooperating cooking plates, a support therefor, a pin secured to one of said plates pivotally mounted on said support, means for releasably holding said pin against rotation on said support whereby said plate is held in a predetermined position, a pivotal connection between said pin and the other plate having its axis coincident with the pivot axis of said pin, and means for latching said second plate to the first.

7. A waffle iron comprising plates provided with cooperating cooking surfaces, means for supporting said plates in substantially upright positions, said plates being formed to provide an aperture through which the cooking material may be poured in between said cooking surfaces, and means for dividing the cooking surfaces into a plurality of sections, said means being arranged to effect uniform distribution of the cooking material over the entire cooking surface.

8. A waffle iron comprising plates provided with cooperating cooking surfaces, means for supporting said plates in substantially upright positions, said plates being formed to provide an aperture through which the cooking material may be poured in between said cooking surfaces, and a plurality of ribs on said plates dividing the cooking surfaces into a plurality of sections and arranged to effect uniform distribution of the cooking material over the entire cooking surface.

9. A waffle iron comprising a base member, cooperating cooking plates pivotally mounted on said base so as to be movable together about a substantially vertical axis, a pivotal connection between said plates having a substantially horizontal axis, and means for securing one of said plates in a substantially vertical position.

10. A waffle iron comprising cooperating cooking plates, a base member, a supporting member pivotally mounted on said base, a pivotal connection between said plates and said supporting member, and means for securing said plates in a substantially vertical position during the cooking operation.

11. A waffle iron comprising cooperating cooking plates, electric heating means for each of said plates, a base member, a supporting member pivotally mounted on said base, pivotal connections between said plates and between said plates and said supporting member having a common axis which is substantially at right angles to the axis of the pivotal connection between said supporting member and said base, and means for securing one of said plates to said supporting member in a substantially vertical position.

12. A waffle iron comprising cooperating cooking plates, a base member, a supporting member pivotally mounted on said base so as to be movable about a substantially vertical axis, and pivotal connections between said plates and between said plates and said support having a common axis which is substantially horizontal.

In witness whereof, I have hereunto set my hand this twenty sixth day of December, 1922.

ALBERT H. SIMMONS.